US008885078B2

(12) United States Patent
Ichikawa et al.

(10) Patent No.: US 8,885,078 B2
(45) Date of Patent: Nov. 11, 2014

(54) IMAGE PROCESSING APPARATUS, IMAGE PROCESSING METHOD, AND RECORDING MEDIUM STORING IMAGE PROCESSING PROGRAM

(75) Inventors: Manabu Ichikawa, Hachioji (JP); Takuya Matsunaga, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 280 days.

(21) Appl. No.: 13/313,665

(22) Filed: Dec. 7, 2011

(65) Prior Publication Data

US 2012/0154642 A1 Jun. 21, 2012

(30) Foreign Application Priority Data

Dec. 21, 2010 (JP) ................................. 2010-284875

(51) Int. Cl.
| | | |
|---|---|---|
| H04N 9/64 | (2006.01) | |
| G06T 5/00 | (2006.01) | |
| H04N 1/409 | (2006.01) | |
| H04N 5/21 | (2006.01) | |
| H04N 5/232 | (2006.01) | |

(52) U.S. Cl.
CPC ...... *H04N 1/409* (2013.01); *G06T 2207/20192* (2013.01); *G06T 5/002* (2013.01); *H04N 5/23209* (2013.01); *H04N 5/21* (2013.01)
USPC .......................................... 348/251; 348/241

(58) Field of Classification Search
USPC ................................................ 348/251, 241
See application file for complete search history.

(56) References Cited

U.S. PATENT DOCUMENTS

| | | | | |
|---|---|---|---|---|
| 6,831,687 | B1 * | 12/2004 | Suzuki ........................... | 348/251 |
| 8,274,583 | B2 * | 9/2012 | Zimmer et al. ................ | 348/251 |
| 8,542,301 | B2 * | 9/2013 | Ono et al. ....................... | 348/251 |
| 8,587,703 | B2 * | 11/2013 | Lelescu et al. ................. | 348/251 |
| 2011/0025889 | A1 * | 2/2011 | Pinto et al. ..................... | 348/251 |

FOREIGN PATENT DOCUMENTS

| | | |
|---|---|---|
| JP | 2005-269373 | 9/2005 |
| JP | 2007-011926 | 1/2007 |
| JP | 2008-293424 | 12/2008 |
| JP | 2009-118080 | 5/2009 |
| JP | 2009-177244 | 8/2009 |
| JP | 2010-014810 | 1/2010 |
| JP | 2010-074244 | 4/2010 |
| JP | 2010-109834 | 5/2010 |

OTHER PUBLICATIONS

Office Action from corresponding Chinese Patent Application Serial No. 201110427397.9, mailed Jan. 6, 2014 (9 pgs.) with English translation (11 pgs.).
Office Action from corresponding Japanese Patent Application No. 2010-284875, mailed Apr. 15, 2014 (3 pgs.) with English translation (5 pgs.).

* cited by examiner

*Primary Examiner* — Anthony J Daniels
(74) *Attorney, Agent, or Firm* — John C. Pokotylo; Straub & Pokotylo

(57) ABSTRACT

An image processing apparatus includes a noise reduction intensity control unit that controls a noise reduction intensity, which indicates a degree to which noise reduction is applied to image data, on the basis of a luminance variation ratio, which indicates a variation amount by which a luminance of the image data gradually varies, and a noise reduction unit that reduces a noise in the image data on the basis of the noise reduction intensity controlled by the noise reduction intensity control unit.

14 Claims, 15 Drawing Sheets

IMAGE PROCESSING APPARATUS, IMAGE PROCESSING METHOD, AND RECORDING MEDIUM STORING IMAGE PROCESSING PROGRAM

FIELD OF THE INVENTION

This invention relates to a technique for suppressing a false contour in image data having a luminance that varies gradually.

BACKGROUND OF THE INVENTION

Depending on characteristics of a lens employed in image pickup, a phenomenon known as shading, in which a peripheral edge portion of an image is darker than a central portion, may occur. JP2005-269373A discloses a technique for reducing noise on the peripheral edge portion of an image by dynamically varying a parameter used by a noise reduction filter in accordance with a correction amount used to correct shading.

JP2010-74244A, meanwhile, discloses a technique for adding shading to an image during image processing without modifying an optical system.

Further, JP2008-293424A discloses a technique of performing noise reduction appropriately in accordance with a frequency of an image by performing multiplex resolution conversion on the image to generate a plurality of band image signals having different frequency bands to each other, and implementing noise removal processing on the respective band image signals.

In a digital image, a discrete luminance is expressed by a numerical value. Therefore, a false contour may be visible on a boundary between a region having a certain luminance and a region having a slightly different luminance. This problem is likely to occur on an image exhibiting shading, or in other words an image on which the luminance varies gradually from region to region.

SUMMARY OF THE INVENTION

An image processing apparatus of an aspect of the present invention includes a noise reduction intensity control unit that controls a noise reduction intensity, which indicates a degree to which noise reduction is applied to image data, on the basis of a luminance variation ratio, which indicates a variation amount by which a luminance of the image data gradually varies, and a noise reduction unit that reduces a noise in the image data on the basis of the noise reduction intensity controlled by the noise reduction intensity control unit.

An image processing method of another aspect of the present invention includes a step of controlling a noise reduction intensity, which indicates a degree to which noise reduction is applied to image data, on the basis of a luminance variation ratio, which indicates a variation amount by which a luminance of the image data gradually varies, and a step of reducing a noise in the image data on the basis of the controlled noise reduction intensity.

A recording medium of yet another aspect of the present invention stores an image processing program. The image processing program causes a computer to execute a step of controlling a noise reduction intensity, which indicates a degree to which noise reduction is applied to image data, on the basis of a luminance variation ratio, which indicates a variation amount by which a luminance of the image data gradually varies, and a step of reducing a noise in the image data on the basis of the controlled noise reduction intensity.

BRIEF DESCRIPTION OF THE DRAWINGS

These and other features, aspects, and advantages of the apparatus and methods of the present invention will become better understood with regard to the following description, appended claims, and accompanying drawings.

DETAILED DESCRIPTION OF THE PREFERRED EMBODIMENTS

<First Embodiment>

Figure 1:
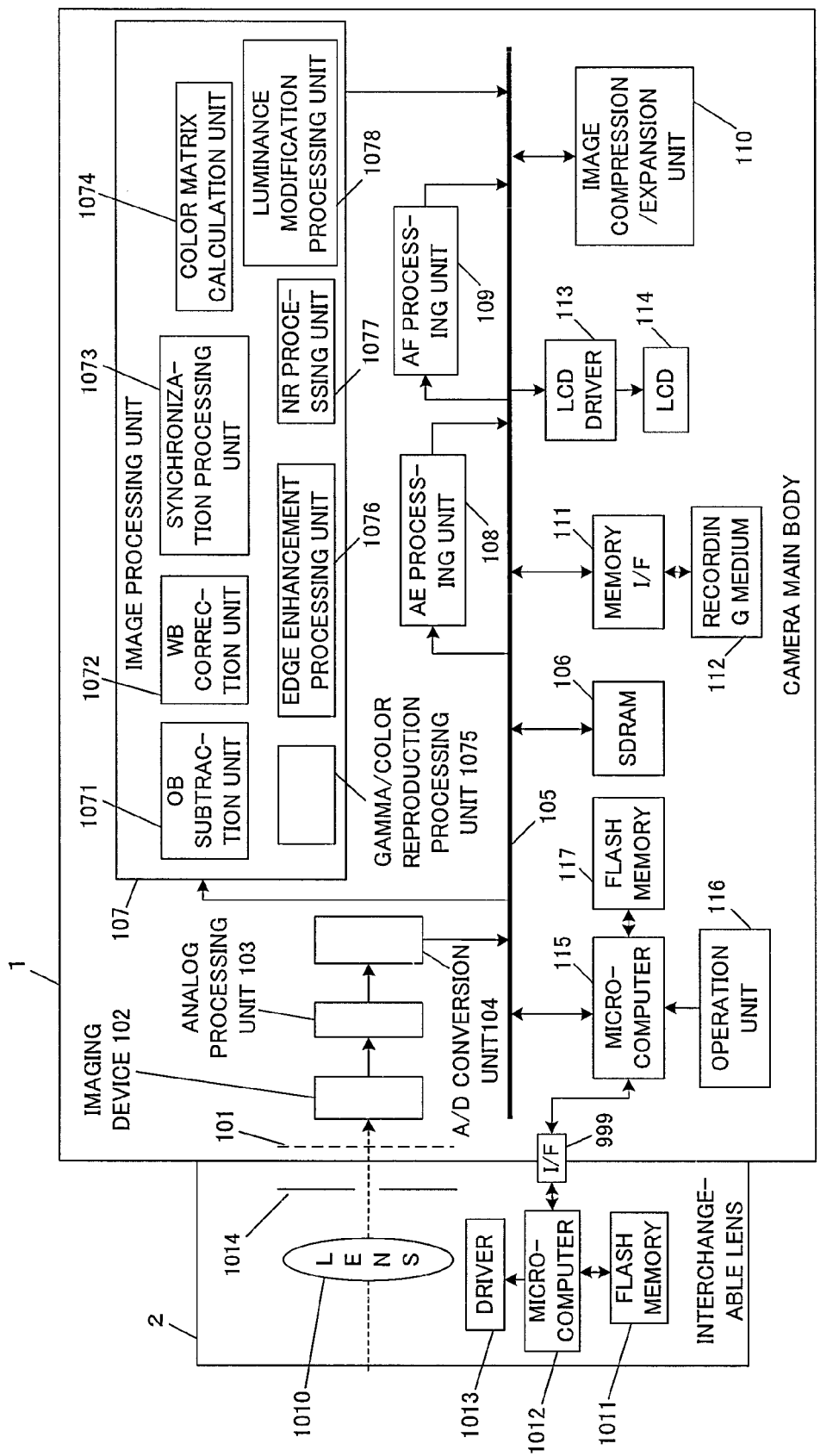
FIG. 1 is a block diagram showing the constitution of a digital still camera to which an image processing apparatus according to a first embodiment is applied.

FIG. 1 is a block diagram showing the constitution of a digital still camera to which an image processing apparatus according to a first embodiment is applied. The digital still camera shown in FIG. 1 is constituted by a camera main body 1 and an interchangeable lens 2.

The interchangeable lens 2 includes a lens 1010, a Flash memory 1011, a microcomputer 1012, a driver 1013, and a diaphragm 1014. The interchangeable lens 2 is connected communicably to the camera main body 1 via an I/F 999.

The camera main body 1 includes a mechanical shutter 101, an imaging device 102, an analog processing unit 103, an analog/digital conversion unit 104 (A/D conversion unit 104 hereafter), a bus 105, an SDRAM 106, an image processing unit 107, an AE processing unit 108, an AF processing unit 109, an image compression/expansion unit 110, a memory interface 111 (memory I/F 111 hereafter), a recording medium 112, an LCD driver 113, an LCD 114, a microcomputer 115, an operating unit 116, and a Flash memory 117.

The lens 1010 condenses an optical image of an object on the imaging device 102. The lens 1010 may be a single vision lens or a zoom lens.

The microcomputer 1012 is connected to the I/F 999, the Flash memory 1011, and the driver 1013 in order to read and write information stored in the Flash memory 1011 and control the driver 1013. The information stored in the Flash memory 1011 includes data indicating a focal length of the interchangeable lens 2, information indicating a shading characteristic of the lens 1010, and so on.

The microcomputer 1012 is also capable of communicating with the microcomputer 115 via the I/F 999 in order to transmit various information to the microcomputer 115 and receive information such as an aperture value from the microcomputer 115.

The driver 1013 drives the lens 1010 in order to modify the focal length and a focus position and drives the diaphragm 1014 upon reception of an instruction from the microcomputer 1012. The diaphragm 1014 is provided in the vicinity of the lens 1010 in order to adjust a light quantity of the object.

The mechanical shutter 101 is driven upon reception of an instruction from the microcomputer 115 in order to control a time during which the object is exposed to the imaging device 102.

The imaging device 102 is formed such that color filters in a Bayer arrangement are disposed on a front surface of a photodiode constituting each pixel. In the Bayer arrangement, a line on which a red (R) pixel and a green (G or Gr) pixel are disposed alternately in a horizontal direction and a line on which a green (G or Gb) pixel and a blue (B) pixel are disposed alternately in the horizontal direction are provided, and these two lines are disposed alternately in a vertical direction. The imaging device 102 receives light condensed by the lens 1010 on the photodiodes constituting the pixels and performs photoelectric conversion such that a light quantity is output to the analog processing unit 103 as an electric charge quantity. The imaging device 102 may be a CMOS device or a CCD device. Further, instead of an imaging device in which color filters are disposed in the Bayer arrangement, the imaging device may be formed from a FOVEON (Registered Trademark) image sensor, for example, in which R, G, B information can all be extracted from a single pixel.

The analog processing unit 103 reduces reset noise and the like and then performs waveform shaping on an electric signal (analog image signal) read from the imaging device 102, and also performs gain-up processing to obtain a target brightness.

The A/D conversion unit 104 converts the analog image signal output from the analog processing unit 103 into a digital image signal (to be referred to hereafter as image data).

The bus 105 is a transfer path for transferring various data generated in the interior of the digital camera to the various internal units of the digital camera. The bus 105 is connected to the A/D conversion unit 104, the SDRAM 106, the image processing unit 107, the AE processing unit 108, the AF processing unit 109, the image compression/expansion unit 110, the memory I/F 111, the LCD driver 113, and the microcomputer 115.

The image data output from the A/D conversion unit 104 are stored temporarily in the SDRAM 106 via the bus 105. The SDRAM 106 is a storage unit for temporarily storing various data such as the image data obtained in the A/D conversion unit 104 and image data processed in the image processing unit 107 and the image compression/expansion unit 110.

The image processing unit 107 includes an optical black subtraction unit 1071 (OB subtraction unit 1071 hereafter), a white balance correction unit 1072 (WB correction unit 1072 hereafter), a synchronization processing unit 1073, a color matrix calculation unit 1074, a gamma/color reproduction processing unit 1075, an edge enhancement processing unit 1076, a noise reduction processing unit 1077 (NR processing unit 1077 hereafter), and a luminance modification processing unit 1078. The image processing unit 107 implements various types of image processing on image data read from the SDRAM 106.

The OB subtraction unit 1071 performs optical black subtraction processing (OB subtraction processing hereafter) on the image data. OB subtraction processing is processing for subtracting an optical black value (OB value hereafter) attributable to a dark current or the like of the imaging device 102 from a pixel value of each pixel constituting the image data.

The WB correction unit 1072 performs white balance correction processing by multiplying a white balance gain corresponding to a white balance mode by the image data. The white balance mode may be set by a user in accordance with light sources including clear sky, cloudy sky, an incandescent lamp, and a fluorescent lamp.

The synchronization processing unit 1073 synchronizes image data in the Bayer arrangement into image data in which R, G, B information is included in each pixel. The color matrix calculation unit 1074 corrects the colors of the image data by performing a linear transformation in which a color matrix coefficient is multiplied by the image data. The gamma/color reproduction processing unit 1075 performs gamma correction processing and color reproduction processing for varying a tint of the image.

The edge enhancement processing unit 1076 performs edge enhancement processing on the image data by extracting an edge component from the image data using a band pass filter, multiplying the data relating to the extracted edge component by a coefficient corresponding to a degree of edge enhancement, and then adding the result to the image data.

The NR processing unit (also referred to as a noise reduction intensity control unit and a noise reduction unit) 1077 performs noise reduction processing through processing employing a filter that reduces high frequencies, coring processing for correcting contours, and so on.

The luminance modification processing unit (also referred to as a luminance modification unit) 1078 performs processing for modifying a luminance of the image data. The processing for modifying the luminance of the image data is processing for adding shading to an image, for example. The processing for adding shading to the image may be performed using a known method, for example a method described in JP2010-74244A.

Following the various processing performed by the image processing unit 107, the image data are stored in the SDRAM 106.

The AE processing unit 108 calculates an object luminance from the image data. Data for calculating the object luminance may be constituted by an output of a dedicated photometric sensor. The AF processing unit 109 extracts a high frequency component signal from the image data and obtains a focus evaluation value through AF (Auto Focus) integration processing.

When still image data are recorded, the image compression/expansion unit 110 reads the image data from the SDRAM 106, compresses the read image data in accordance with a JPEG compression format, and temporarily stores the compressed JPEG image data in the SDRAM 106. The microcomputer 115 creates a JPEG file by attaching a JPEG header required to construct a JPEG file to the JPEG image data stored in the SDRAM 106, and records the created JPEG file in the recording medium 112 via the memory I/F 111.

When moving image data are recorded, the image compression/expansion unit 110 reads the moving image data from the SDRAM 106, compresses the read moving image data in accordance with the H.264 format, for example, and temporarily stores the compressed moving image data in the SDRAM 106. Further, the image compression/expansion unit 110 performs processing to expand the compressed data on the basis of a command from the microcomputer 115.

The recording medium 112 is constituted by a memory card that can be attached to and detached from the camera main body 1, for example, but is not limited thereto, and may be a memory built into the camera main body 1, for example.

The LCD driver 113 displays an image on the LCD 114. Image display includes rec view display in which image data are displayed briefly immediately after image pickup, reproduction display of a JPEG file recorded in the recording medium 112, and moving image display such as live view display. When the compressed data recorded in the recording medium 112 are to be reproduced, the image compression/expansion unit 110 reads the compressed data recorded in the recording medium 112, implements expansion processing thereon, and then temporarily stores the expanded data in the SDRAM 106. The LCD driver 113 performs display by reading the expanded data from the SDRAM 106, converting the read data into a video signal, and then outputting the video signal to the LCD 114.

The microcomputer 115, which functions as a control unit, controls various sequences of the digital camera main body 1 comprehensively. The operation unit 116 and the flash memory 117 are connected to the microcomputer 115.

The operation unit 116 is constituted by operating members such as a power supply button, a release button, a moving image button, a reproduction button, a menu button, and various types of input keys. The microcomputer 115 executes various types of sequences corresponding to a user operation when the user operates one of the operation members of the operation unit 116. The power supply button is an operation member for switching a power supply of the digital camera ON and OFF. When the power supply button is pressed, the power supply of the digital camera is switched on. When the power supply button is pressed again, the power supply of the digital camera is switched OFF. The release button is configured to include two-step switches consisting of a first release switch and a second release switch. When the release button is half-pressed to switch the first release switch ON, the microcomputer 115 performs image pickup preparation sequences such as AE processing and AF processing. When the release button is fully pressed to switch the second release switch ON, the microcomputer 115 performs image pickup by executing an image pickup sequence.

The reproduction button is a button for displaying a still image or a moving image obtained through image pickup on the LCD 114.

The moving image button is a button for starting and terminating a moving image pickup operation. In an initial state, moving image pickup is not performed, and therefore, when the moving image button is pressed in this state, moving image pickup begins. When the moving image button is pressed during moving image pickup, the moving image pickup is terminated. Hence, every time the moving image button is pressed, moving image pickup is started and stopped alternately.

The menu button is a button for displaying a menu screen on which camera settings can be modified on the LCD 114. The modifiable camera settings include, for example, various settings relating to a luminance modification mode, which is a mode for modifying the luminance of the image, various settings relating to a recording mode, and various settings relating to a moving image file recording format.

The flash memory 117 stores various parameters required to operate the digital camera, such as white balance gains corresponding to white balance modes, a color matrix coefficient, and a low pass filter coefficient, table data defining a relationship between a coordinate position on an image and a noise reduction intensity, a serial number for identifying the digital still camera, and so on.

Moreover, various types of programs executed by the microcomputer 115 are also stored in the flash memory 117. The microcomputer 115 reads parameters required for various types of sequences from the flash memory 117 and executes various types of processing in accordance with the programs stored in the flash memory 117.

Figure 2:
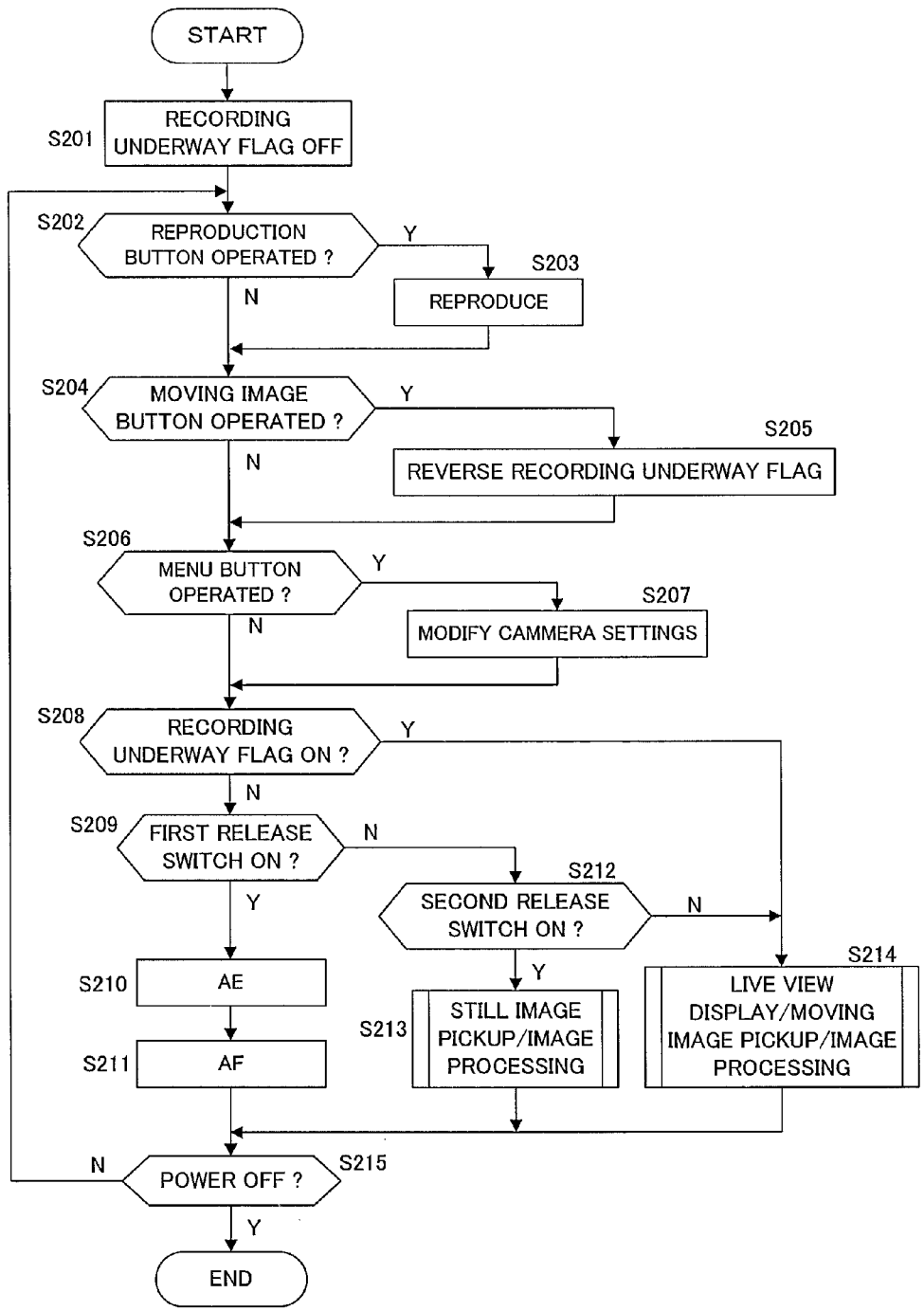
FIG. 2 is a flowchart showing main processing performed by the digital still camera to which the image processing apparatus according to the first embodiment is applied.

FIG. 2 is a flowchart showing main processing performed by the digital still camera to which the image processing apparatus according to the first embodiment is applied. The microcomputer 115 starts the processing of a step S201 when the power supply button is pressed by the user to switch the power supply of the digital still camera ON.

In the step S201, a recording underway flag is initialized to OFF. The recording underway flag is ON when moving image pickup is underway and OFF when moving image pickup is not underway.

In a step S202, a determination is made as to whether or not the reproduction button has been operated by the user. When it is determined that the reproduction button has been operated, the routine advances to a step S203, and when it is determined that the reproduction button has not been operated, the routine advances to a step S204.

In the step S203, processing is performed to reproduce a still image or a moving image obtained through image pickup.

In the step S204, a determination is made as to whether or not the moving image button has been operated by the user. When it is determined that the moving image button has been operated, the routine advances to a step S205, and when it is determined that the moving image button has not been operated, the routine advances to a step S206.

In the step S205, the recording underway flag is reversed, whereupon the routine advances to the step S206. As described above, moving image pickup is started and stopped alternately every time the moving image button is pressed. Therefore, in this step, the recording underway flag is reversed to ON when OFF and to OFF when ON.

In the step S206, a determination is made as to whether or not the menu button has been operated by the user. When it is determined that the menu button has been operated, the routine advances to a step S207, and when it is determined that the menu button has not been operated, the routine advances to a step S208.

In the step S207, the menu screen is displayed on the LCD 114, and the camera settings are modified in accordance with the operation performed by the user.

In the step S208, a determination is made as to whether or not the recording underway flag is ON. When it is determined that the recording underway flag is ON, the routine advances to a step S214. When it is determined in the step S214 that moving image recording is underway, image processing and image compression are performed in relation to image data of a moving image based on an image signal output from the imaging device 102, whereupon the processed compressed image is recorded in the recording medium 112. When it is determined that moving image recording is not underway, live view displayed is performed in order to determine an object composition and a shutter timing for a still image pickup operation. The live view display/moving image pickup/image processing of the step S214 will be described in detail below using FIG. 4.

When it is determined in the step S208 that the recording underway flag is OFF, on the other hand, the routine advances to a step S209. In the step S209, a determination is made as to whether or not the release button has been half-pressed by the user such that the first release switch is ON. When it is determined that the first release switch is ON, the routine advances to a step S210.

In the step S210, AE processing is performed. More specifically, the ISO sensitivity, aperture, and shutter speed are determined in the AE processing unit 108 by calculating the object luminance and looking up an exposure condition determination table stored in the Flash memory 117 on the basis of the calculated object luminance.

In a step S211, AF processing is performed. More specifically, first, the focus evaluation value is calculated in the AF processing unit 109. The microcomputer 115 then outputs a command to drive the lens 1010 to the driver 1013 on the basis of the focus evaluation value. The driver 1013 then drives the lens 1010 on the basis of the command in order to modify the focal length and focus position.

When it is determined that the first release switch has not been switched ON or that the first release switch has been left ON in the step S209, the routine advances to a step S212. In the step S212, a determination is made as to whether or not the release button has been fully pressed by the user such that the second release switch is ON. When it is determined that the second release switch is ON, the routine advances to a step S213, and when it is determined that the second release switch is not ON, the routine advances to a step S214.

In the step S213, still image pickup/image processing is performed. The still image pickup/image processing will be described in detail below using FIG. 3.

In a step S215, a determination is made as to whether or not the power supply of the digital still camera has been switched OFF. When it is determined that the power supply has not been switched OFF, the routine returns to the step S202, where the processing described above is performed. When it is determined that the user has pressed the power supply button to switch the power supply OFF, on the other hand, the processing of the flowchart is terminated.

Hence, in the main flow according to this embodiment, a still image pickup mode is set as an initial setting, and in this state, the steps S202→S204→S206→S208→S209→S212→S214→S215→S202 are executed in sequence while performing live view display. When the release button is half-pressed during the live view display, an AE operation is performed in the step S210 and an AF operation is performed in the step S211. When the release button is fully pressed, still image pickup is performed in the step S213. Further, when the moving image button is pressed, the recording underway flag is switched ON in the step S205, whereupon the steps S206→S208→S214→S215→S202→S204→S206 are executed repeatedly to continue the moving image pickup. When the moving image button is pressed again in this state, the recording underway flag is switched OFF in the step S205, whereupon the routine returns to the still image flow described above.

Figure 3:
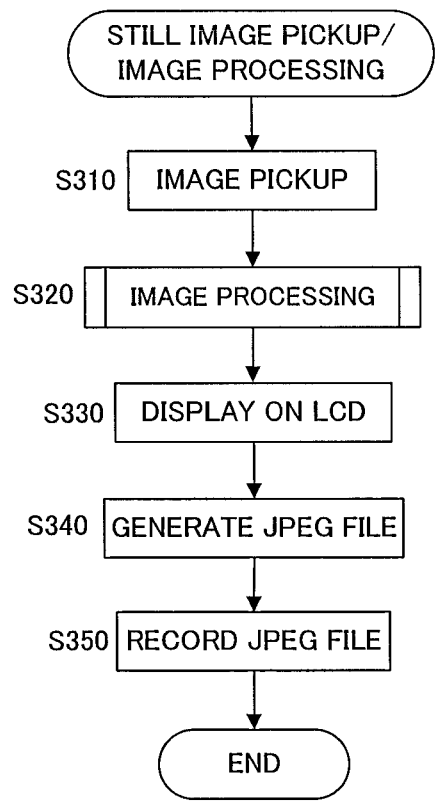
FIG. 3 is a flowchart showing in detail the still image pickup/image processing.

FIG. 3 is a flowchart showing in detail the processing of the step S213 in the flowchart shown in FIG. 2, or in other words the still image pickup/image processing.

In a step S310, still image pickup is performed. The still image pickup is performed using a similar method to a conventionally employed method. The driver 1013 drives the diaphragm 1014 on the basis of an instruction from the microcomputer 1012 to realize a set aperture value. Image pickup is then performed by controlling the mechanical shutter 101 on the basis of the determined shutter speed, whereby image data corresponding to the determined ISO sensitivity are obtained.

In a step S320, image processing is performed by implementing various types of image processing on the image data (Bayer data) obtained in the image pickup operation of the step S310 and converting the image data into luminance (Y) and color difference (Cb, Cr) signal data. The image processing will be described in detail below using FIG. 5.

In a step S330, the image data obtained in the image pickup are displayed briefly on the LCD 114 by the LCD driver 113. This display is so-called rec view display.

In a step S340, JPEG compression is performed on the image data in the image compression/expansion unit 110, whereupon a JPEG file is generated by attaching header information such as an image size and image pickup conditions.

In a step S350, the JPEG file generated in the step S340 is recorded in the recording medium 112 via the memory I/F 111.

Figure 4:
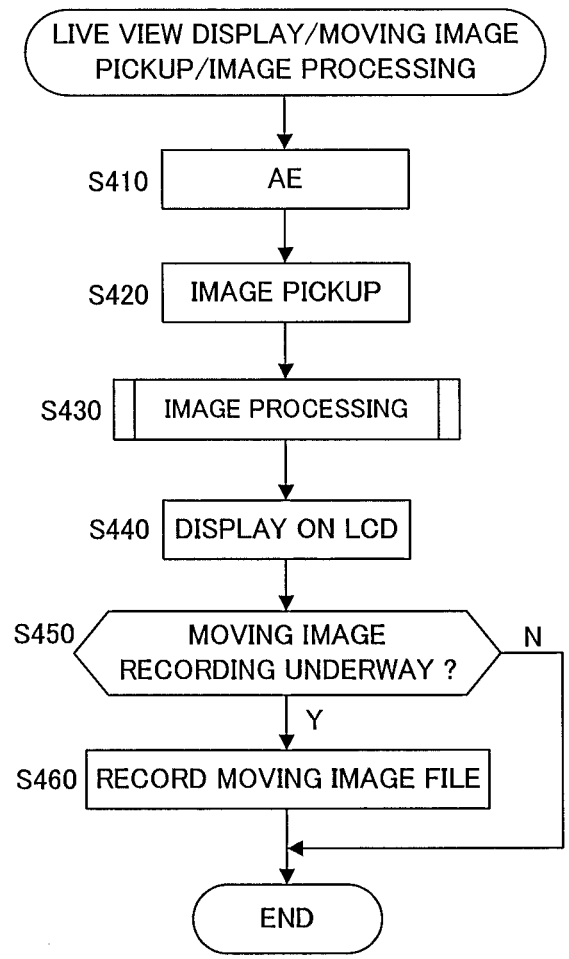
FIG. 4 is a flowchart showing in detail the live view display/moving image pickup/image processing.

FIG. 4 is a flowchart showing in detail the processing of the step S214 in the flowchart shown in FIG. 2, or in other words the live view display/moving image pickup/image processing.

In a step S410, AE processing is performed. This processing is identical to the processing of the step S210 in the flowchart shown in FIG. 2.

In a step S420, image pickup is performed. The image pickup (moving image pickup) is performed using a similar method to a conventionally employed method. In other words, image pickup is performed by controlling a so-called electronic shutter on the basis of the determined aperture, shutter speed, and ISO sensitivity.

In a step S430, image processing is performed by implementing various types of image processing on the image data (Bayer data) obtained in the image pickup operation of the step S420 and converting the image data into luminance (Y) and color difference (Cb, Cr) signal data. The image processing will be described in detail below using FIG. 5.

In a step S440, the image data are displayed on the LCD 114 by the LCD driver 113. This display is so-called live view display.

In a step S450, a determination is made as to whether or not moving image recording is underway. When the recording underway flag is OFF, it is determined that moving image recording is not underway, and therefore the processing of this flowchart is terminated. When the recording underway flag is ON, it is determined that moving image recording is underway and the routine advances to a step S460.

In the step S460, a moving image file is generated and recorded in the recording medium 112 at a time corresponding to a frame immediately after the start of recording, while subsequent frames are added to the moving image file and recorded in the recording medium 112. More specifically, compression corresponding to the format of the moving image file is performed on the image data in the image compression/expansion unit 110, whereupon a moving image file is generated by attaching predetermined header information. Moving image file compression formats include "H.264", "Motion JPEG", and "MPEG". The generated moving image file is then recorded in the recording medium 112 via the memory I/F 111.

Figure 5:
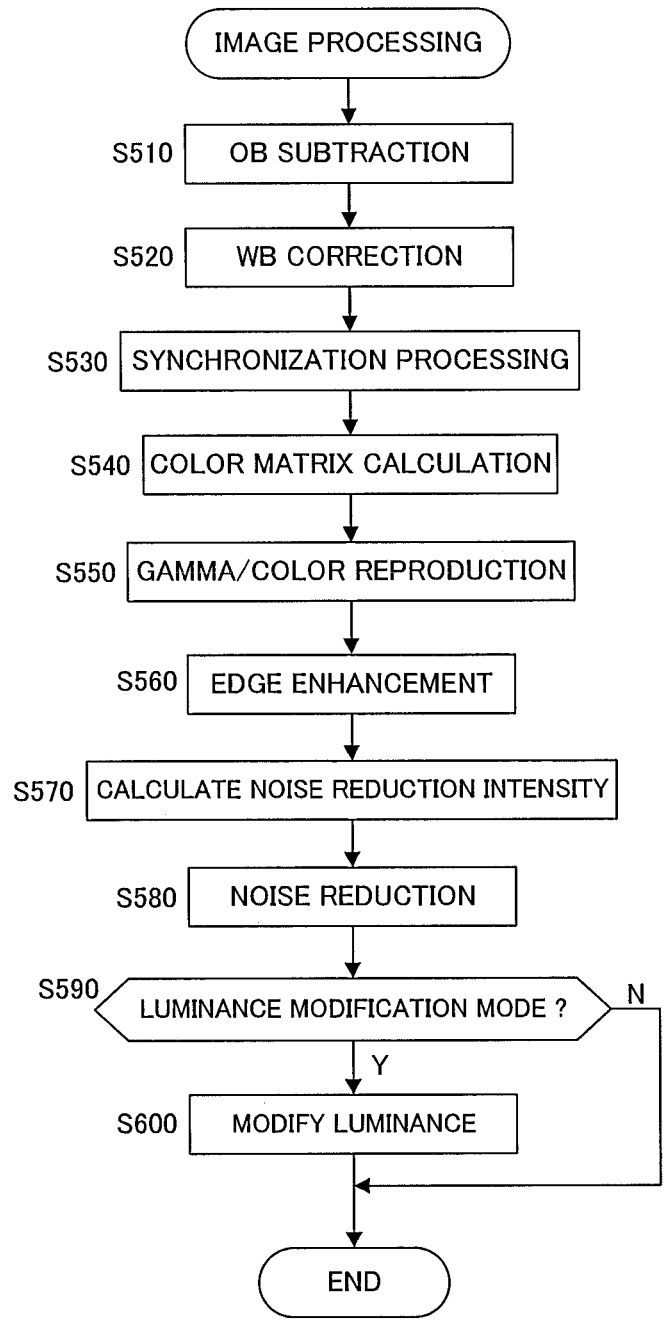
FIG. 5 is a flowchart showing in detail the image processing.

FIG. 5 is a flowchart showing in detail the processing of the step S320 in the flowchart shown in FIG. 3 and the processing of the step S430 of the flowchart shown in FIG. 4, i.e. the image processing.

In a step S510, OB subtraction processing for subtracting the OB value obtained during the image pickup from the image data obtained during the image pickup is implemented by the OB subtraction unit 1071.

In a step S520, the WB correction unit 1072 implements white balance correction processing on the image data subjected to the OB subtraction processing by multiplying a white balance gain corresponding to the white balance mode by the image data. It should be noted that the white balance mode can be set by the user for each image pickup operation by operating an input key included in the operation unit 116. The microcomputer 115 sets the white balance mode on the basis of an operation of the operation unit 116 performed by the user. Alternatively, when the digital still camera includes an auto-white balance function for adjusting the white balance automatically, the microcomputer 115 calculates a white balance gain corresponding to a light source at the time of the image pickup operation automatically.

In a step S530, the synchronization processing unit 1073 implements synchronization processing on the image data subjected to the white balance correction processing.

In a step S540, the color matrix calculation unit 1075 performs a color matrix calculation on the image data subjected to the synchronization processing by multiplying a color matrix coefficient corresponding to the white balance mode by the image data.

In a step S550, the gamma/color reproduction processing unit 1075 performs gamma correction processing and color reproduction processing for varying the tint of the image on the image data subjected to the color matrix calculation.

In a step S560, the edge enhancement processing unit 1076 performs edge enhancement processing on the image data subjected to the gamma correction processing and the color reproduction processing.

In a step S570, the NR processing unit 1077 determines a noise reduction intensity (also referred to as an NR intensity) indicating a degree of noise reduction. A method of determining the noise reduction intensity will be described in detail below.

Figure 6:
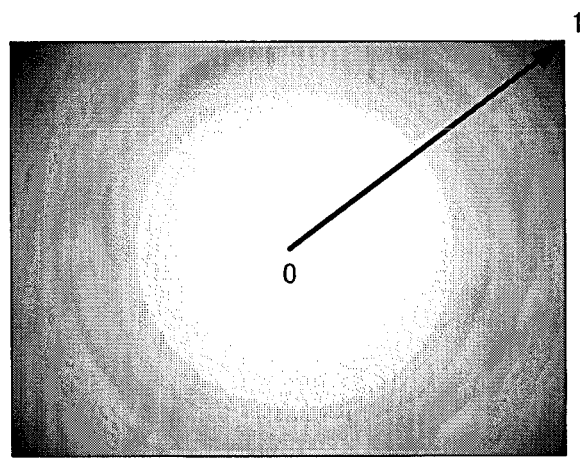
FIG. 6 is a view showing an example of shading added to the image by a luminance modification processing unit.

FIG. 6 is a view showing an example of shading added to the image by the luminance modification processing unit 1078. FIG. 6 shows shading that becomes gradually darker toward a peripheral edge of the image from a center of the image. Further, in the figure, a distance from the center of the image is standardized such that a distance from the center of the image to the four corners of the image is 1.

Figure 7:
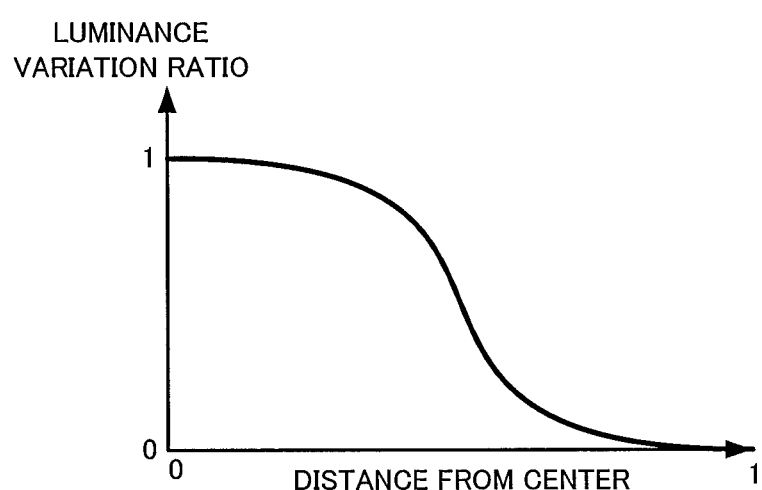
FIG. 7 is a view showing a relationship between a distance from the center of the image and a luminance variation ratio of the image with respect to the shading shown in FIG. 6.

FIG. 7 is a view showing a relationship between the distance from the center of the image and a luminance variation ratio of the image with respect to the shading shown in FIG. 6. The luminance variation ratio of the image is a degree to which the luminance of the image is modified (an amount by which the luminance of the image is modified) by the luminance modification processing unit 1078.

The shading shown in FIG. 6 exhibits a characteristic according to which the luminance in the center of the image is not modified, but the luminance decreases as the distance from the center of the image increases such that the luminance in the four corners of the image is lowest. Therefore, as shown in FIG. 7, a luminance variation ratio of 1 is obtained in a position where the distance from the center of the image is 0, and a steadily smaller luminance variation ratio is obtained as the distance from the center of the image increases. Further, a luminance variation ratio of 0 is obtained in the position where the distance from the center is 1 (i.e. in the four corners of the image).

The luminance variation ratio is a coefficient that is multiplied by the image data when the luminance modification processing unit 1078 performs the processing for adding shading to the image. In other words, by multiplying a luminance variation ratio corresponding to the distance from the center, such as that shown in FIG. 7, by a luminance value of each pixel, it is possible to generate an image to which shading such as that shown in FIG. 6 is added.

Figure 8:
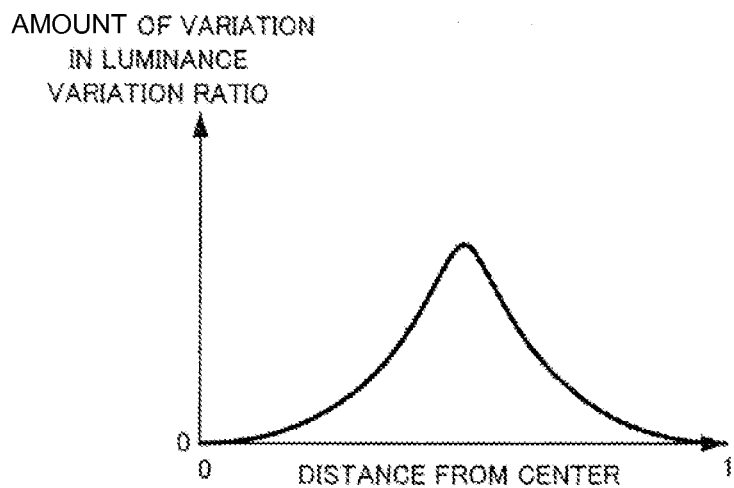
FIG. 8 is a view showing a relationship between the distance from the center of the image and an amount of variation in the luminance variation ratio of the image with respect to the shading shown in FIG. 6.

FIG. 8 is a view showing a relationship between the distance from the center of the image and an amount of variation in the luminance variation ratio of the image with respect to the shading shown in FIG. 6. It should be noted that the variation amount is an absolute value. As is evident from the graph shown in FIG. 8, the amount of variation in the luminance variation ratio of the image takes a steadily smaller value toward both the center and the four corners of the image. Further, the amount of variation in the luminance variation ratio reaches a maximum in an approximately midway position between the center and the four corners of the image.

In a region of the image where luminance variation is large, a false contour is likely to be visible. Therefore, in the image processing apparatus according to this embodiment, the visibility of the false contour is reduced by steadily reducing the noise reduction intensity employed during the noise reduction processing as the amount of variation in the luminance variation ratio of the image increases.

Figure 9:
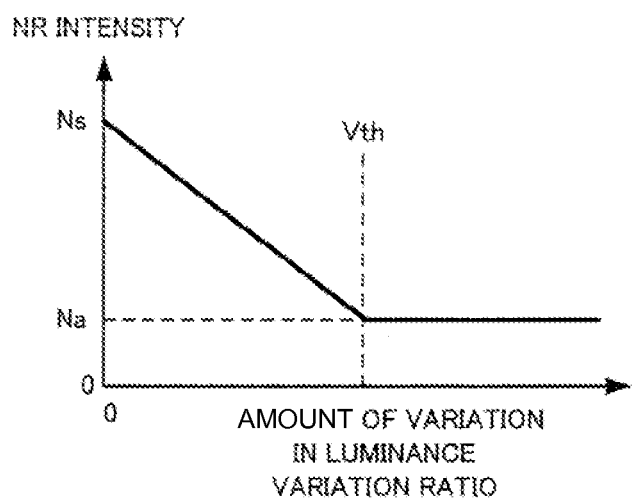
FIG. 9 is a view showing a relationship between the amount of variation in the luminance variation ratio of the image and a noise reduction intensity.

FIG. 9 is a view showing a relationship between the amount of variation in the luminance variation ratio of the image and the noise reduction intensity. The noise reduction intensity is set at Ns when the amount of variation in the luminance variation ratio is 0, and reduced steadily as the amount of variation in the luminance variation ratio of the image increases. It should be noted, however, that in the example shown in FIG. 9, the noise reduction intensity is fixed at a predetermined intensity Na when the amount of variation in the luminance variation ratio equals or exceeds a predetermined threshold Vth. In other words, to ensure that the noise reduction processing is performed with a certain degree of intensity, the noise reduction intensity is not reduced to 0 even when the amount of variation in the luminance variation ratio equals or exceeds the predetermined threshold Vth.

The characteristic of the shading added to the image by the luminance modification processing unit 1078, or in other words a luminance variation characteristic, is determined in advance. It is therefore possible to determine in advance a relationship between a pixel position on the image and the noise reduction intensity in accordance with the characteristic of the shading added to the image on the basis of the principles described above using FIGS. 6 to 9. In this embodiment, table data defining a relationship between coordinates of each pixel of the image and the noise reduction intensity are prepared in advance and stored in the Flash memory 117. The NR processing unit 1077 reads the table data defining the relationship between the coordinates of each pixel and the noise reduction intensity from the Flash memory 117, and determines a noise reduction intensity corresponding to the coordinates of each pixel by referring to the read table data.

When the processing for adding shading is not performed by the luminance modification processing unit 1078, the noise reduction intensity for all pixels is set at the noise reduction intensity Ns used when the amount of variation in the luminance variation ratio is 0.

In a step S580 of FIG. 5, the NR processing unit 1077 performs noise reduction processing corresponding to the noise reduction intensity determined in the step S570 on the image data subjected to the edge enhancement processing.

Here, large-grain noise may appear on the image when noise reduction processing corresponding to the noise reduction intensity determined in the step S570 is implemented on the image data of a low frequency component. Hence, in this embodiment, the image data are divided into a high frequency component and a low frequency component using a known method, whereupon noise reduction processing based on the noise reduction intensity determined in the step S570 is implemented on the image data of the high frequency component. Noise reduction processing based on a predesigned noise reduction intensity Ns' is then implemented on the image data of the low frequency component. The noise reduction-processed image data of the high frequency component and the noise reduction-processed image data of the low frequency component are then synthesized to generate noise reduction-processed image data.

In a step S590 of FIG. 5, a determination is made as to whether or not the camera is set in a luminance modification mode. When it is determined that the camera is not set in the luminance modification mode, the processing of the flowchart is terminated, and when it is determined that the camera is set in the luminance modification mode, the routine advances to a step S600.

In the step S600, luminance modification processing is performed by the luminance modification processing unit 1078 on the image data subjected to the noise reduction processing. The luminance modification processing is processing for adding shading exhibiting the characteristic shown in FIG. 6, for example. It should be noted, however, that the shading added to the image is not limited to that shown in FIG. 6.

Figure 10A:
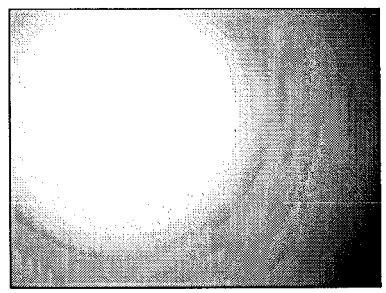
FIG. 10A is a view showing shading exhibiting a characteristic according to which a position deviating from the center of the image is set as a reference and the luminance decreases steadily away from the reference position.
Figure 10B:
FIG. 10B is a view showing shading exhibiting a characteristic according to which the luminance decreases steadily away from the center of the image but in a horizontally elongated elliptical shape rather than a concentric circle shape.
Figure 10C:
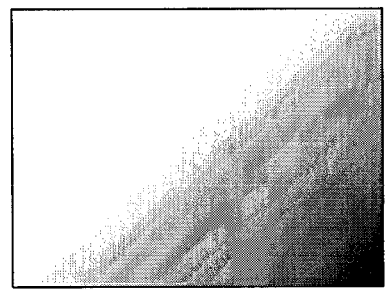
FIG. 10C is a view showing shading exhibiting a characteristic according to which the luminance decreases gradually from an upper left corner to a lower right corner of the image.
Figure 10D:
FIG. 10D is a view showing shading exhibiting a characteristic that corresponds to the shape of a person.

FIGS. 10A to 10D are views showing other examples of the shading added to the image. FIG. 10A is a view showing shading exhibiting a characteristic according to which a position deviating from the center of the image is set as a reference and the luminance decreases steadily away from the reference position. FIG. 10B is a view showing shading exhibiting a characteristic according to which the luminance decreases steadily away from the center of the image but in a horizontally elongated elliptical shape rather than a concentric circle shape. FIG. 10C is a view showing shading exhibiting a characteristic according to which the luminance decreases gradually from an upper left corner to a lower right corner of the image. FIG. 10D is a view showing shading exhibiting a characteristic that corresponds to the shape of a person. These shading characteristics may also be set such that the luminance decreases steadily toward the reference position. The shading characteristic shown in FIG. 10D will now be described using FIG. 11.

Figure 11:
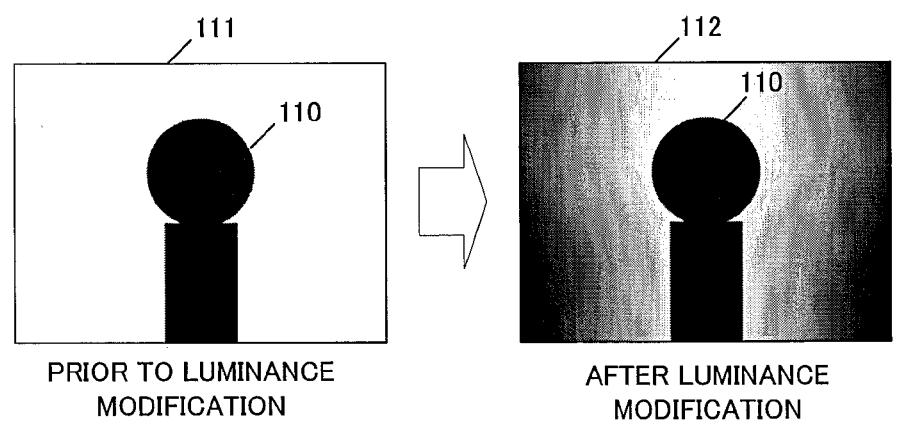
FIG. 11 is a view showing an image prior to the addition of shading and an image to which shading exhibiting a characteristic that corresponds to the shape of a person has been added.

FIG. 11 is a view showing an image 111 prior to the addition of shading and an image 112 to which shading exhibiting a characteristic that corresponds to the shape of a person has been added. A person 110 appears in the center of the respective images 111, 112. In the image 112 following the addition of shading, the luminance decreases steadily away from a position of the person 110 in accordance with the shape of the person 110.

With the image processing apparatus according to the first embodiment, described above, the noise reduction intensity is controlled on the basis of the luminance variation ratio indicating the amount by which the luminance of the image data gradually varies, and noise in the image data is reduced on the basis of the controlled noise reduction intensity. Therefore, using noise reduction processing typically performed in a camera, false contours can be suppressed effectively while suppressing increases in circuit scale and image processing time.

Further, with the image processing apparatus according to the first embodiment, the noise reduction intensity is controlled on the basis of the amount of variation in the luminance variation ratio. In particular, the noise reduction intensity is reduced as the amount of variation in the luminance variation ratio increases. Therefore, by reducing the noise reduction intensity in a region where the amount of variation in the luminance variation ratio is large such that a false contour is more likely to be visible, the false contour can be diffused by the noise, and as a result, the false contour is less likely to be visible. Further, the noise reduction intensity is not reduced in a region where the amount of variation in the luminance variation ratio is small such that a false contour is unlikely to be visible, and therefore an increase in noise in a region where a false contour is unlikely to be visible can be avoided.

<Second Embodiment>

In the image processing apparatus according to the first embodiment, luminance modification processing is performed on image data subjected to noise reduction processing. In an image processing apparatus according to a second embodiment, the noise reduction processing is performed after subjecting the image data to the luminance modification processing.

Figure 12:
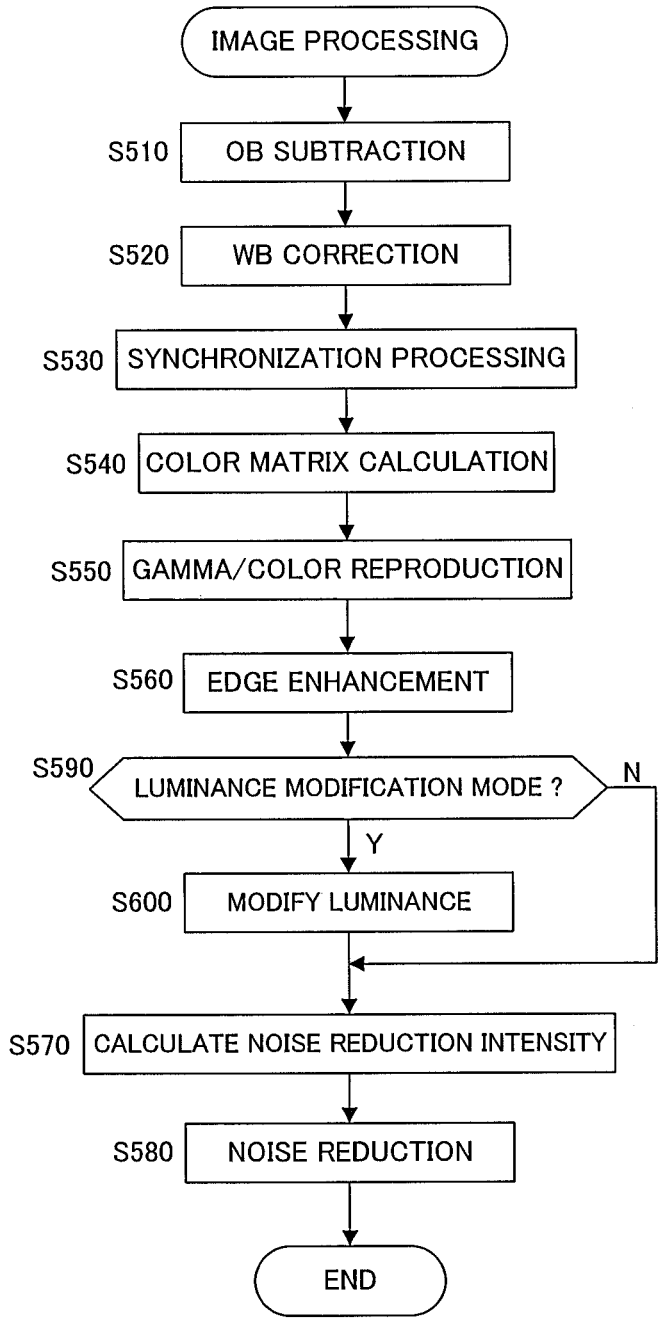
FIG. 12 is a flowchart showing in detail image processing performed by the image processing apparatus according to a second embodiment.

FIG. 12 is a flowchart showing in detail image processing performed by the image processing apparatus according to the second embodiment. Steps in which identical processing to the processing of the flowchart shown in FIG. 5 is performed have been allocated identical reference numerals.

The flowchart shown in FIG. 12 differs from the flowchart shown in FIG. 5 in that the processing of the steps S570 and S580 is performed after the processing of the step S600. In other words, the noise reduction intensity is determined in the step S570 and the noise reduction processing is performed in the step S580 after the luminance modification processing has been performed on the image data in the step S600. A method of determining the noise reduction intensity and a method of performing the noise reduction processing are identical to the methods described in the first embodiment.

With the image processing apparatus according to the second embodiment, similarly to the image processing apparatus according to the first embodiment, false contours can be suppressed effectively using noise reduction processing typically performed in a camera while suppressing increases in circuit scale and image processing time.

<Third Embodiment>

Figure 13:
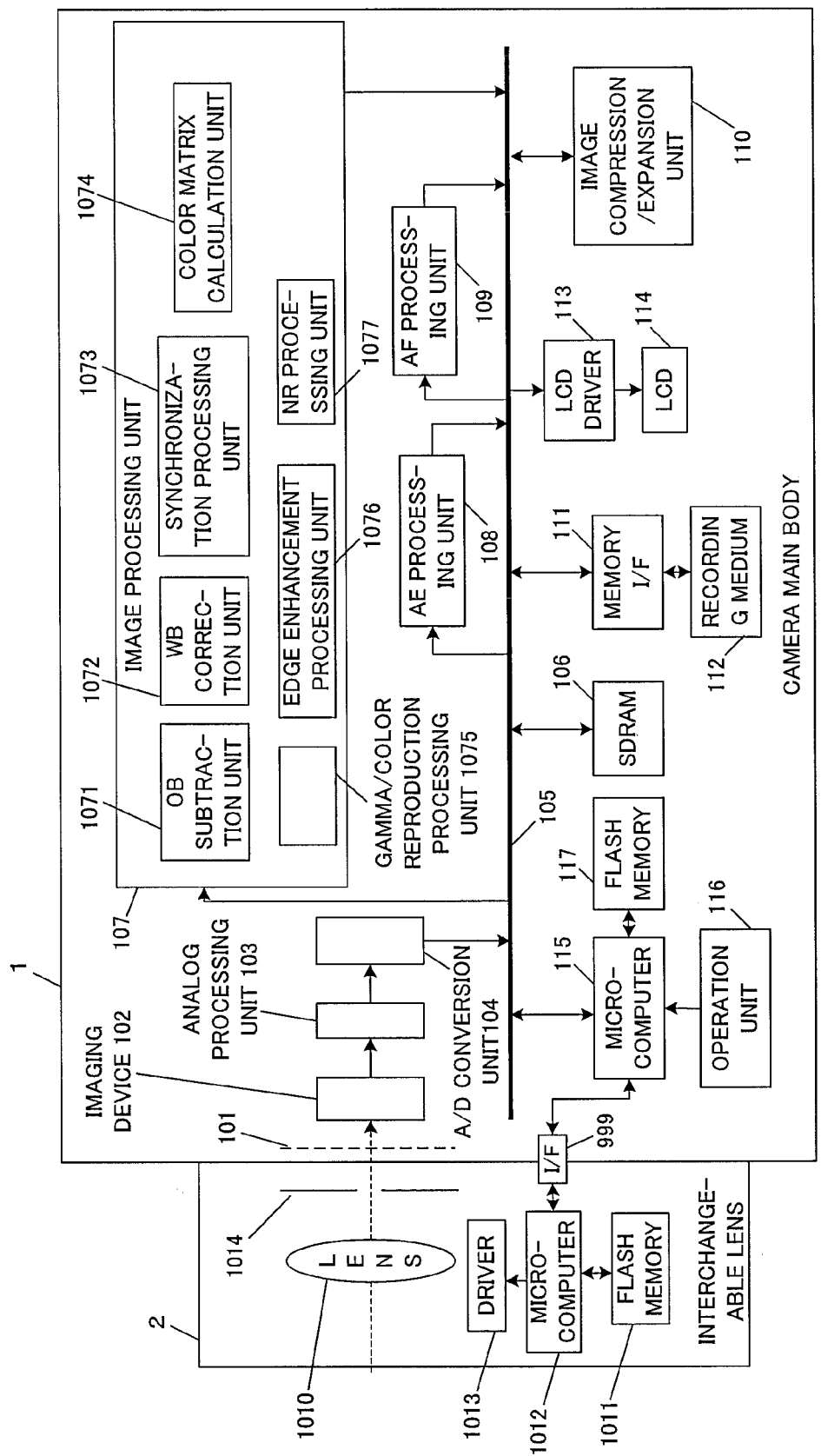
FIG. 13 is a block diagram showing the constitution of a digital still camera to which an image processing apparatus according to a third embodiment is applied.

FIG. 13 is a block diagram showing the constitution of a digital still camera to which an image processing apparatus according to a third embodiment is applied. The digital still camera shown in FIG. 13 is formed by removing the luminance modification processing unit 1078 from the digital still camera shown in FIG. 1.

In the digital still camera to which the image processing apparatus according to the third embodiment is applied, it is assumed that shading is added to an image obtained through image pickup due to optical characteristics of the lens 1010.

Figure 14:
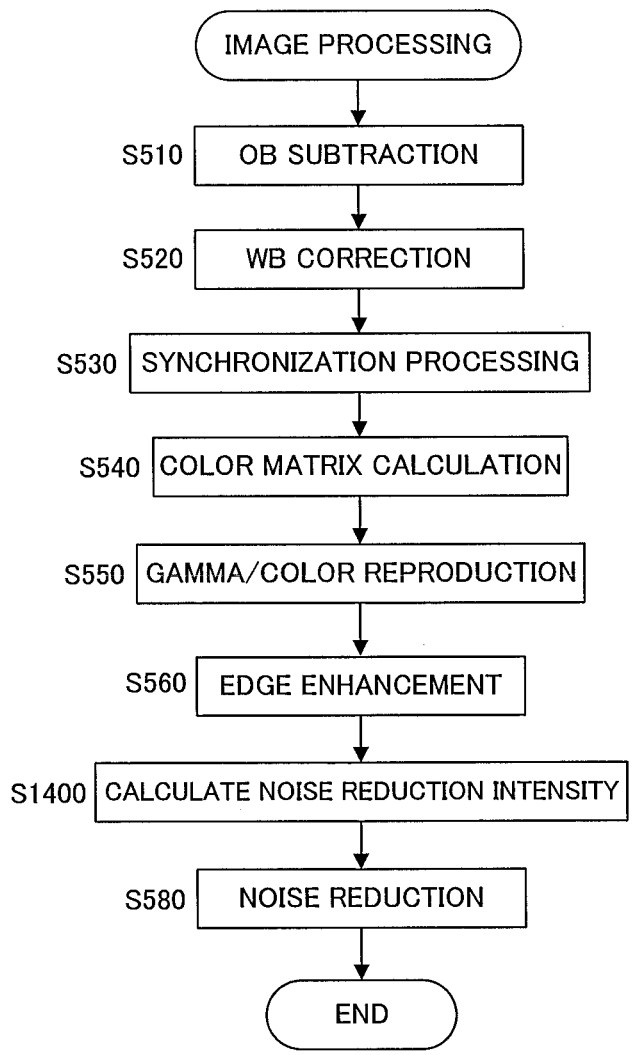
FIG. 14 is a flowchart showing in detail image processing performed by the image processing apparatus according to the third embodiment.

FIG. 14 is a flowchart showing in detail image processing performed by the image processing apparatus according to the third embodiment. Steps in which identical processing to the processing of the flowchart shown in FIG. 5 is performed have been allocated identical reference numerals.

On the flowchart shown in FIG. 14, the processing of the steps S590 and S600 of the flowchart shown in FIG. 5 has been omitted, and processing of a step S1400 has been provided in place of the processing of the step S570. The processing of the step S1400, which differs from the processing of the flowchart shown in FIG. 5, will now be described in detail.

First, in the step S1400, information indicating a shading characteristic of the lens 1010 used during image pickup is obtained from the Flash memory 1011.

Figure 15:
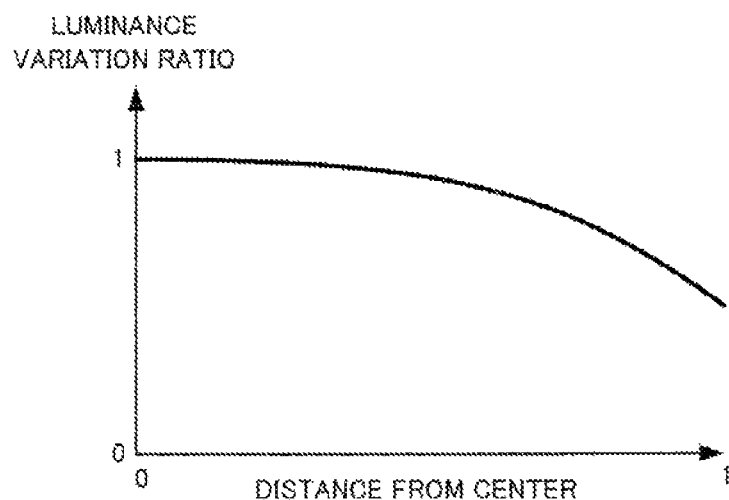
FIG. 15 is a view showing an example of the shading characteristic of a lens.

FIG. 15 is a view showing an example of the shading characteristic of the lens 1010. In FIG. 15, the abscissa shows the distance from the center of the image and the ordinate shows the luminance variation ratio of the image. As shown in FIG. 15, the luminance variation ratio decreases as the distance from the center of the image increases. In other words, the image obtained through image pickup using the lens 1010 is an image on which the luminance decreases as the distance from the center of the image increases.

Figure 16:
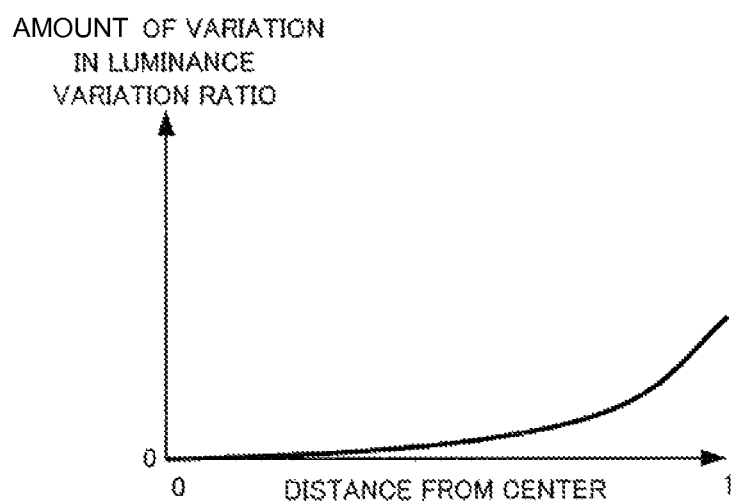
FIG. 16 is a view showing a relationship between the distance from the center of the image and the amount of variation in the luminance variation ratio of the image with respect to the shading characteristic shown in FIG. 15.

FIG. 16 is a view showing a relationship between the distance from the center of the image and the amount of variation in the luminance variation ratio of the image with respect to the shading characteristic shown in FIG. 15. It should be noted that the variation amount is an absolute value. As shown in FIG. 16, the amount of variation in the luminance variation ratio increases as the distance from the center of the image increases.

As described above, a false contour is more likely to be visible in a region where the luminance variation of the image is large, and therefore the noise reduction intensity employed during the noise reduction processing is reduced as the amount of variation in the luminance variation ratio of the image increases. The relationship between the amount of variation in the luminance variation ratio of the image and the noise reduction intensity is as shown in FIG. 9, for example.

According to this method, the noise reduction intensity is determined for each pixel of the image. In the step S580 following the step S1400, the NR processing unit 1077 performs noise reduction processing corresponding to the noise reduction intensity determined in the step S1400 on the image data subjected to the edge enhancement processing.

With the image processing apparatus according to the third embodiment, described above, the noise reduction intensity is controlled on the basis of the luminance variation ratio indicating the amount by which the luminance in the peripheral edge portion of the image decreases relative to the luminance in the central portion of the image due to the optical characteristic of the lens employed during image pickup. Noise in the image data in which the luminance in the peripheral edge portion of the image is smaller than the luminance in the central portion of the image is then reduced on the basis of the controlled noise reduction intensity. As a result, false contours can be suppressed effectively using noise reduction processing typically performed in a camera while suppressing increases in circuit scale and image processing time with respect to an image on which the luminance varies gradually due to the optical characteristics of the lens.

Further, in the image processing apparatus according to the third embodiment, the noise reduction intensity is controlled on the basis of the amount of variation in the luminance variation ratio. In particular, the noise reduction intensity is reduced as the amount of variation in the luminance variation ratio increases. Therefore, by reducing the noise reduction intensity in a region where the amount of variation in the luminance variation ratio is large such that a false contour is more likely to be visible, the false contour can be diffused by the noise, and as a result, the false contour is less likely to be visible. Further, the noise reduction intensity is not reduced in a region where the amount of variation in the luminance variation ratio is small such that a false contour is unlikely to be visible, and therefore an increase in noise in a region where a false contour is unlikely to be visible can be avoided.

<Fourth Embodiment>

In an image processing apparatus according to a fourth embodiment, a noise reduction parameter employed in the noise reduction processing is set uniformly on the basis of the luminance variation ratio of the image, irrespective of the coordinates on the image.

Figure 17:
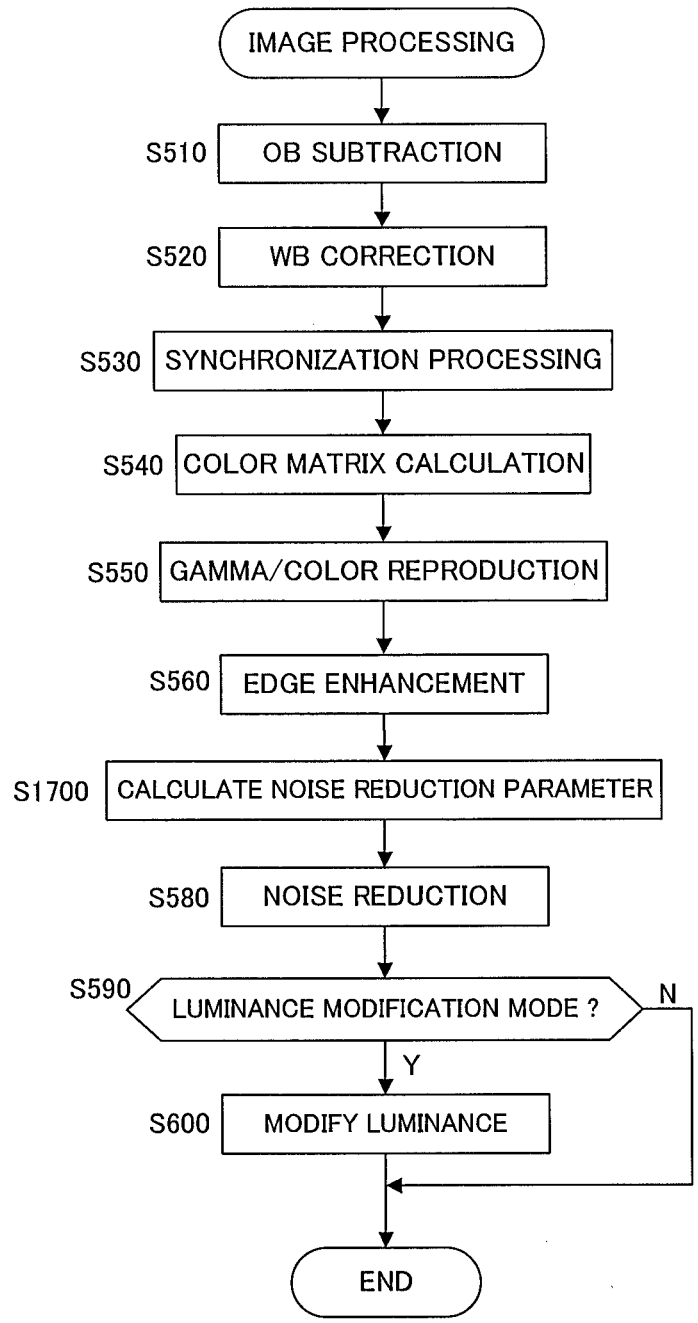
FIG. 17 is a flowchart showing in detail image processing performed by the image processing apparatus according to a fourth embodiment.

FIG. 17 is a flowchart showing in detail image processing performed by the image processing apparatus according to the fourth embodiment. Steps in which identical processing to the processing of the flowchart shown in FIG. 5 is performed have been allocated identical reference numerals.

On the flowchart shown in FIG. 17, a step S1700 is provided in place of the step S570 of the flowchart shown in FIG. 5. Processing performed in the step S1700, which differs from the processing of the flowchart shown in FIG. 5, will now be described in detail.

In the step S1700, the noise reduction parameter (also referred to as an NR parameter) employed in the noise reduction processing is determined on the basis of the luminance variation ratio when the luminance modification processing is performed by the luminance modification processing unit 1078. Here, if the luminance variation ratio when the luminance is not modified is set at a maximum value of 1, a first NR parameter is set when a minimum value of the luminance variation ratio is smaller than a predetermined threshold Th1 and a second NR parameter is set when the minimum value of the luminance variation ratio is equal to or greater than the predetermined threshold Th1. The second NR parameter is a noise reduction parameter used during normal noise reduction processing, while the first NR parameter is a parameter having a smaller noise reduction intensity than the second NR parameter.

Figure 18A:
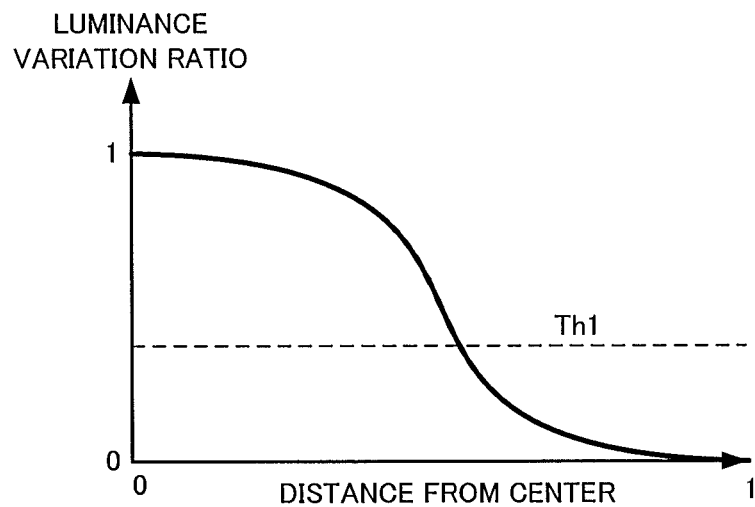
FIG. 18A corresponds to FIG. 7 and show the relationship between the distance from the center of the image and the luminance variation ratio of the image.
Figure 18B:
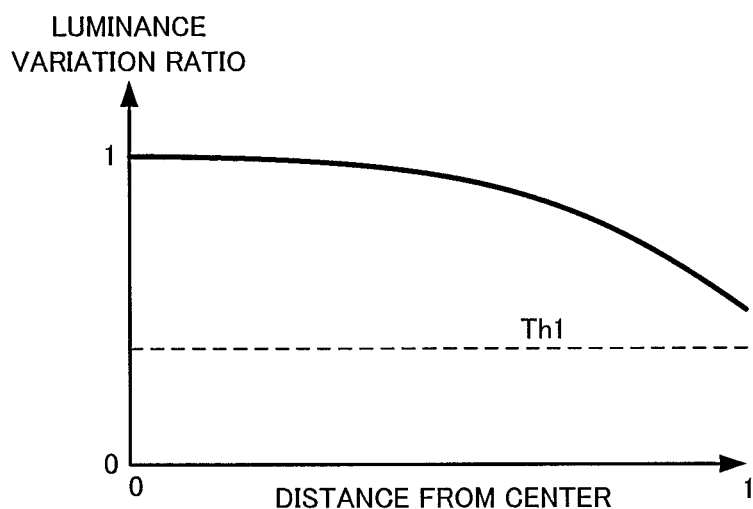
FIG. 18B corresponds to FIG. 15 and show the relationship between the distance from the center of the image and the luminance variation ratio of the image.

FIGS. 18A and 18B correspond respectively to FIGS. 7 and 15, and show the relationship between the distance from the center of the image and the luminance variation ratio of the image. In a characteristic shown in FIG. 18A, the minimum value of the luminance variation ratio of the image is smaller than the predetermined threshold Th1. Hence, when the minimum value of the luminance variation ratio is smaller than the predetermined threshold Th1, as in the characteristic shown in FIG. 18A, the first NR parameter having the smaller noise reduction intensity is set as the noise reduction parameter to be used during the noise reduction processing.

In a characteristic shown in FIG. 18B, on the other hand, the minimum value of the luminance variation ratio of the image is equal to or greater than the predetermined threshold Th1. Hence, when the minimum value of the luminance variation ratio is equal to or greater than the predetermined threshold Th1, as in the characteristic shown in FIG. 18B, the second NR parameter having the normal noise reduction intensity is set as the noise reduction parameter to be used during the noise reduction processing.

Here, 1, which is the maximum value of the luminance variation ratio, may be set as the predetermined threshold Th1. When processing for modifying the luminance of the image data, such as processing for adding shading to the image data, is performed by the luminance modification processing unit 1078, the luminance variation ratio becomes smaller than 1. In other words, by setting the predetermined threshold Th1 at 1, the first NR parameter having the smaller noise reduction intensity is set when luminance modification processing is performed on the image data, and as a result, false contours can be suppressed easily.

In the step S580 of the flowchart shown in FIG. 17, noise reduction processing is performed on the image data using the noise reduction parameter set in the step S1700. In this case, noise reduction processing corresponding to an identical noise reduction parameter is performed on all of the pixels.

With the image processing apparatus according to the fourth embodiment, described above, when the luminance variation ratio is smaller than a predetermined luminance variation ratio, the noise reduction intensity is reduced and the noise reduction processing is performed in accordance with the reduced noise reduction intensity. Therefore, using noise reduction processing typically performed in a camera, false contours can be suppressed easily while suppressing increases in circuit scale and image processing time.

It should be noted that the noise reduction parameter used during the noise reduction processing may be set uniformly, regardless of the coordinates on the image, on the basis of the amount of variation in the luminance variation ratio of the image rather than the luminance variation ratio of the image. In this case, the first NR parameter is set when a maximum value of the amount of variation in the luminance variation ratio is larger than a predetermined threshold Th2, and the second NR parameter is set when the maximum value of the amount of variation in the luminance variation ratio is equal to or smaller than the predetermined threshold Th2. The first NR parameter has a smaller noise reduction intensity than the second NR parameter.

Figure 19A:
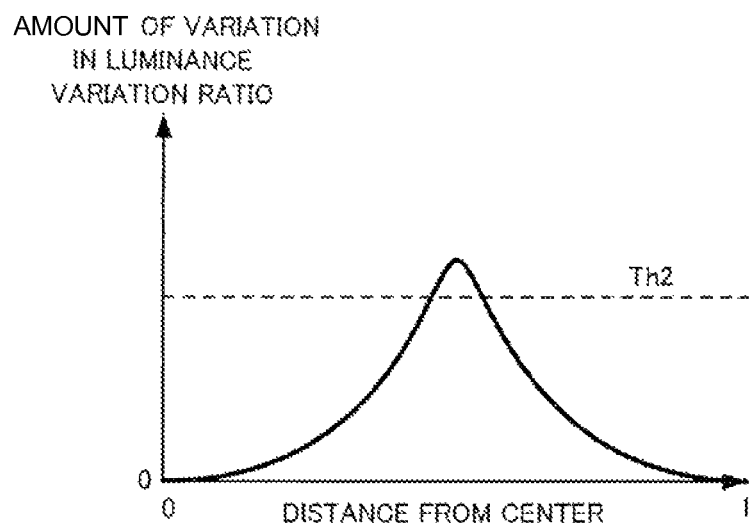
FIG. 19A corresponds to FIG. 8 and show the relationship between the distance from the center of the image and the amount of variation in the luminance variation ratio of the image.
Figure 19B:
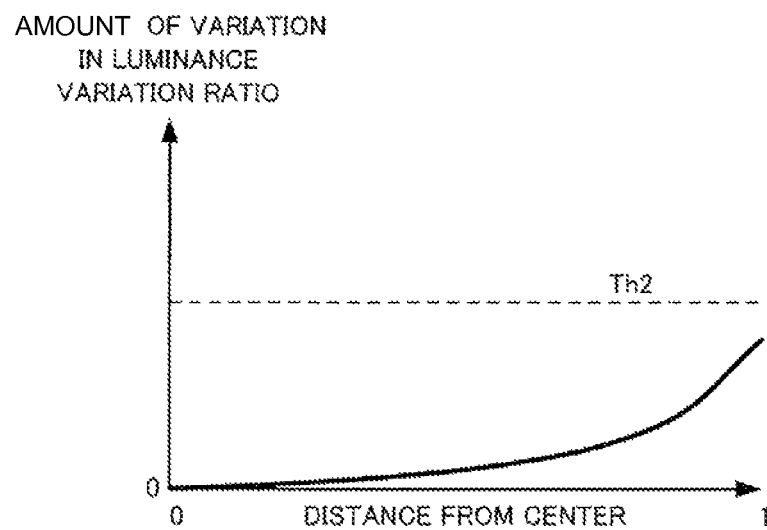
FIG. 19B corresponds to FIG. 16 and show the relationship between the distance from the center of the image and the amount of variation in the luminance variation ratio of the image.

FIGS. 19A and 19B correspond respectively to FIGS. 8 and 16, and show the relationship between the distance from the center of the image and the amount of variation in the luminance variation ratio of the image. In a characteristic shown in FIG. 19A, the maximum value of the amount of variation in the luminance variation ratio of the image is larger than the predetermined threshold Th2. Hence, when the maximum value of the amount of variation in the luminance variation ratio is larger than the predetermined threshold Th2, as in the characteristic shown in FIG. 19A, the first NR parameter having the smaller noise reduction intensity is set as the noise reduction parameter to be used during the noise reduction processing.

In a characteristic shown in FIG. 19B, on the other hand, the maximum value of the amount of variation in the luminance variation ratio of the image is equal to or smaller than the predetermined threshold Th2. Hence, when the maximum value of the amount of variation in the luminance variation ratio is equal to or smaller than the predetermined threshold Th2, as in the characteristic shown in FIG. 19B, the second NR parameter having the normal noise reduction intensity is set as the noise reduction parameter to be used during the noise reduction processing.

Here, 0 may be set as the predetermined threshold Th2. When processing for modifying the luminance of the image data, such as processing for adding shading to the image data, is performed by the luminance modification processing unit 1078, the amount of variation in the luminance variation ratio becomes larger than 0. In other words, by setting the predetermined threshold Th2 at 0, the first NR parameter having the smaller noise reduction intensity is set when luminance modification processing is performed on the image data, and as a result, false contours can be suppressed easily.

In the above description of the first to fourth embodiments, it is assumed that the processing performed by the image processing apparatus is hardware processing, but this invention need not be limited to such a constitution. For example, a constitution in which a computer performs the processing by software may be employed. In this case, the computer includes a CPU, a main storage device such as a RAM, and a computer-readable storage medium storing a program for realizing all or a part of the processing described above. Here, the program is referred to as an image processing program. By having the CPU read the image processing program stored on the storage medium and execute information processing/calculation processing, similar processing to that of the image processing apparatus described above is realized.

Here, a computer-readable storage medium denotes a magnetic disk, a magneto-optical disk, a CD-ROM, a DVD-ROM, a semiconductor memory, and so on. Further, the image processing program may be distributed to the computer by a communication line, whereupon the computer executes the received distributed image processing program.

This invention is not limited to the first to fourth embodiments described above, and may be subjected to various amendments and applications within a scope that does not depart from the spirit of the invention. For example, in the image processing apparatus according to the fourth embodiment, the luminance modification processing is performed on the image data subjected to the noise reduction processing, but similarly to the image processing apparatus according to the second embodiment, the noise reduction processing may be performed on the image data after the luminance modification processing.

FIG. 9 shows the relationship between the amount of variation in the luminance variation ratio of the image and the noise reduction intensity, but the relationship shown in FIG. 9 is merely an example, and this relationship is not limited to the characteristics shown in FIG. 9.

In the image processing apparatus according to the first embodiment, the table data defining the relationship between the coordinates of each pixel of the image and the noise reduction intensity are stored in the Flash memory 117, and a noise reduction intensity corresponding to the coordinates of each pixel is determined by referring to the table data. However, the distance from the center of the image may be calculated for each pixel, whereupon the noise reduction intensity may be calculated on the basis of the calculated distance using the principles described with reference to FIGS. 8 and 9.

Further, table data defining a relationship between the noise reduction intensity and an x coordinate and a y coordinate of the image may be prepared in advance so that a noise reduction intensity corresponding to the x coordinate and a noise reduction intensity corresponding to the y coordinate can be determined for each pixel. The noise reduction intensity to be used during the noise reduction processing may then be calculated from the two determined noise reduction intensity values.

In the above description, the digital camera installed with the image processing apparatus is constituted by the camera main body 1 and the interchangeable lens 2, but the digital camera may be a camera in which the camera main body and the lens are integrated or a camera built into a portable telephone, a personal digital assistant (PDA), a game device, and so on. Further, the camera may include a still image pickup function alone or a moving image pickup function alone.

This application claims priority based on JP2010-284875, filed with the Japan Patent Office on Dec. 21, 2010, the entire contents of which are incorporated into this specification by reference.

What is claimed is:

1. An image processing apparatus comprising:
a noise reduction intensity control unit that controls a noise reduction intensity, which indicates a degree to which noise reduction is applied to image data, on the basis of an amount of variation in a luminance variation ratio, which indicates a variation amount by which a luminance of the image data gradually varies;
a noise reduction unit that reduces a noise in the image data on the basis of the noise reduction intensity controlled by the noise reduction intensity control unit; and
a luminance modification unit that modifies the luminance of the image data on the basis of the luminance variation ratio, which indicates the variation amount by which the luminance gradually varies, in accordance with coordinates of the image data.

2. The image processing apparatus as defined in claim 1, wherein the noise reduction unit reduces the noise in the image data subjected to luminance modification by the luminance modification unit.

3. The image processing apparatus as defined in claim 1, wherein the luminance modification unit modifies the luminance of the image data subjected to noise reduction by the noise reduction unit.

4. The image processing apparatus as defined in claim 2, wherein the luminance modification unit modifies the luminance of the image data by multiplying the luminance variation ratio by a luminance value of the image data.

5. The image processing apparatus as defined in claim 3, wherein the luminance modification unit modifies the luminance of the image data by multiplying the luminance variation ratio by a luminance value of the image data.

6. The image processing apparatus as defined in claim 1, wherein the noise reduction intensity control unit controls the noise reduction intensity on the basis of an amount of variation in a luminance variation ratio indicating a luminance variation amount by which the luminance in a peripheral edge portion of the image decreases relative to the luminance in a central portion due to an optical characteristic of a lens employed in an image pickup operation, and
the noise reduction unit reduces the noise in the image data, in which the luminance in the peripheral edge portion of the image is smaller than the luminance in the central portion, on the basis of the noise reduction intensity controlled by the noise reduction intensity control unit.

7. The image processing apparatus as defined in claim 1, wherein the noise reduction intensity control unit reduces the noise reduction intensity as the amount of variation in the luminance variation ratio increases.

8. The image processing apparatus as defined in claim 1, wherein the noise reduction intensity control unit reduces the noise reduction intensity when the luminance variation ratio is smaller than a predetermined luminance variation ratio.

9. The image processing apparatus as defined in claim 8, wherein a maximum value of the luminance variation ratio is 1, and the predetermined luminance variation ratio is 1.

10. The image processing apparatus as defined in claim 1, wherein the noise reduction intensity control unit reduces the noise reduction intensity when an amount of variation in the luminance variation ratio is larger than a predetermined amount of variation.

11. The image processing apparatus as defined in claim 10, wherein the predetermined amount of variation is 0.

12. The image processing apparatus as defined in claim 1, wherein the noise reduction unit includes a high frequency noise reduction unit that reduces noise in a high frequency component of the image data, and
the high frequency noise reduction unit reduces the noise in the high frequency component of the image data on the basis of the noise reduction intensity.

13. An image processing method comprising:
a step of controlling a noise reduction intensity, which indicates a degree to which noise reduction is applied to image data, on the basis of an amount of variation in a luminance variation ratio, which indicates a variation amount by which a luminance of the image data gradually varies;
a step of reducing, using a noise reduction unit, a noise in the image data on the basis of the controlled noise reduction intensity; and
a step of modifying the luminance of the image data on the basis of the luminance variation ratio, which indicates the variation amount by which the luminance gradually varies, in accordance with coordinates of the image data.

14. A non-transitory recording medium storing an image processing program, wherein the image processing program causes a computer to execute:
a step of controlling a noise reduction intensity, which indicates a degree to which noise reduction is applied to image data, on the basis of an amount of variation in a luminance variation ratio, which indicates a variation amount by which a luminance of the image data gradually varies;
a step of reducing, using a noise reduction unit, a noise in the image data on the basis of the controlled noise reduction intensity; and
a step of modifying the luminance of the image data on the basis of the luminance variation ratio, which indicates the variation amount by which the luminance gradually varies, in accordance with coordinates of the image data.

* * * * *